(12) United States Patent  
Zhang et al.

(10) Patent No.: US 12,184,155 B2
(45) Date of Patent: Dec. 31, 2024

(54) ELECTRIC TOOL, ELECTRIC MOTOR AND ROTOR ASSEMBLY THEREOF

(71) Applicant: JOHNSON ELECTRIC INTERNATIONAL AG, Murten (CH)

(72) Inventors: Caiyong Zhang, Shenzhen (CN); Jinqiang Ju, Shenzhen (CN); Kar Wai Lam, Hong Kong (CN)

(73) Assignee: JOHNSON ELECTRIC INTERNATIONAL AG, Murten (CH)

( * ) Notice: Subject to any disclaimer, the term of this patent is extended or adjusted under 35 U.S.C. 154(b) by 256 days.

(21) Appl. No.: 17/789,479

(22) PCT Filed: Dec. 24, 2020

(86) PCT No.: PCT/CN2020/139103
§ 371 (c)(1),
(2) Date: Jun. 27, 2022

(87) PCT Pub. No.: WO2021/129758
PCT Pub. Date: Jul. 1, 2021

(65) Prior Publication Data
US 2023/0043226 A1   Feb. 9, 2023

(30) Foreign Application Priority Data

Dec. 27, 2019   (CN) .......................... 201922426309.8

(51) Int. Cl.
H02K 9/06   (2006.01)
B25F 5/00   (2006.01)
(Continued)

(52) U.S. Cl.
CPC ............... H02K 9/06 (2013.01); H02K 1/276 (2013.01); H02K 7/145 (2013.01); H02K 21/14 (2013.01); B25F 5/008 (2013.01)

(58) Field of Classification Search
CPC .......... H02K 9/06; H02K 1/276; H02K 21/14; H02K 7/145; B25F 5/008
(Continued)

(56) References Cited

U.S. PATENT DOCUMENTS 7,679,252 B2 * 3/2010 Iwase ..................... H02K 1/276
310/43
9,397,535 B2 * 7/2016 Yamaguchi ............. H02K 9/06
(Continued)

FOREIGN PATENT DOCUMENTS

CN   103683664 A   3/2014
CN   103928997 A   7/2014
(Continued)

OTHER PUBLICATIONS

English machine translation JP 08088963 (Year: 1996).*
(Continued)

Primary Examiner — Burton S Mullins
(74) Attorney, Agent, or Firm — Aird & McBurney LP

(57) ABSTRACT

The invention provides a power tool, a motor and a rotor assembly of the motor. The rotor assembly includes a rotating shaft, and a rotor body, a limiting member and a cooling fan fixed on the rotating shaft, the limiting member and the cooling fan are respectively arranged at both axial ends of the rotor body, the rotor body includes a rotor core and magnets fixed in the rotor core, the limiting member and the cooling fan jointly limit an axial displacement and a radial displacement of the magnets.

8 Claims, 10 Drawing Sheets

(51) Int. Cl.
*H02K 1/276* (2022.01)
*H02K 7/14* (2006.01)
*H02K 21/14* (2006.01)

(58) Field of Classification Search
USPC ..................................... 310/156.53, 156, 56
See application file for complete search history.

(56) References Cited

U.S. PATENT DOCUMENTS

| | | | |
|---|---|---|---|
| 10,205,365 B2 * | 2/2019 | Beyerl | B25F 5/008 |
| 10,432,045 B2 * | 10/2019 | Hessenberger | H02K 1/276 |
| 2015/0180307 A1 | 6/2015 | Inuzuka | |
| 2017/0373569 A1 * | 12/2017 | Fung | H02K 15/03 |
| 2019/0379249 A1 | 12/2019 | Hessenberger et al. | |

FOREIGN PATENT DOCUMENTS

| | | | | |
|---|---|---|---|---|
| CN | 104753215 A | | 7/2015 | |
| CN | 206099561 U | | 4/2017 | |
| CN | 107546885 A | | 1/2018 | |
| CN | 108768070 A | | 11/2018 | |
| CN | 211606217 U | | 9/2020 | |
| IN | 100999075 A | | 7/2007 | |
| JP | 08088963 A | * | 4/1996 | ............ H02K 29/00 |
| JP | 2008272871 A | * | 11/2008 | ............... B25F 5/00 |
| JP | 2017-34841 | * | 2/2017 | ............... H02K 1/27 |
| WO | 2019187991 A1 | | 10/2019 | |

OTHER PUBLICATIONS

English language translation of the International Search Report from corresponding PCT Application No. PCT/CN2020/139103 Mar. 30, 2021.

* cited by examiner

ELECTRIC TOOL, ELECTRIC MOTOR AND ROTOR ASSEMBLY THEREOF

FIELD OF THE INVENTION

The invention relates to the field of electric technology, and in particular, to rotor assemblies, motors having the rotor assemblies, and power tools having the motors.

BACKGROUND OF THE INVENTION

A rotor of an inner rotor motor usually includes a rotor core and a ring magnet that is sleeved around the rotor core, and the ring magnet is fixed to the rotor core by gluing. The ring magnet is positioned in the axial direction by means of holders fixed to a rotating shaft. However, in some application fields, such as the field of power tools, the motor is required to have a relatively high rotational speed. In order to avoid the ring magnet cracking or even flying off under the high-speed rotation of the rotor, in the prior art, an upper sleeve and a lower sleeve are usually sleeved on the periphery of the ring magnet, which inevitably increases the magnetic resistance, the air gap between the rotor and the stator, the material cost and assembly process of the motor.

SUMMARY OF THE INVENTION

In view of this, the present invention aims to provide a rotor assembly that can solve the above problems, a motor having the rotor assembly, and a power tool having the motor.

For this reason, the present invention provides a rotor assembly, which includes a rotating shaft, and a rotor body, a limiting member and a cooling fan fixed on the rotating shaft, the limiting member and the cooling fan are respectively arranged at both axial ends of the rotor body, the rotor body includes a rotor core and magnets fixed in the rotor core, the limiting member and the cooling fan jointly limit an axial displacement and a radial displacement of the magnets.

In some embodiments, the cooling fan abuts first axial ends of the magnets.

In some embodiments, the cooling fan includes protrusions integrally formed therewith and extending towards the rotor body, the protrusions abut the first axial ends of the magnets.

In some embodiments, the rotor core defines mounting holes for mounting the magnets, and positioning holes respectively communicated with the mounting holes, each of the positioning holes is located on a side of a corresponding one of the mounting holes, the protrusions are at least partially inserted into the positioning holes to abut the magnets, respectively.

In some embodiments, each protrusion comprises a stop portion, and the stop portion abuts against the first axial end of the corresponding magnet, to prevent the magnet from moving towards the cooling fan.

In some embodiments, a radial dimension of one end of each protrusion close to the cooling fan is larger than a radial dimension of a free end of the protrusion to form the stop portion, the stop portion is an inclined surface or a step.

In some embodiments, the cooling fan further comprises a base, the protrusions are integrally formed on the base and completely inserted into the rotor core, the base directly abuts the first axial ends of the magnets.

In some embodiments, each positioning hole is arranged in a center of a side of the corresponding mounting hole facing the rotating shaft or away from the rotating shaft.

In some embodiments, the cooling fan includes a flange integrally formed therewith and extending toward the rotor body, the flange is deformed by the pressing of the rotor core during the installation of the rotor assembly, and at least partially abuts against the axial ends of the magnets.

In some embodiments, the rotor core defines mounting holes for mounting the magnets, and at least parts of the flange are embedded in bottoms of the mounting holes of the rotor core after being deformed to abut the magnets.

In some embodiments, the limiting member abuts against second axial ends of the magnets opposite to the first axial ends directly or through an elastic washer.

In some embodiments, the rotor core defines mounting holes for mounting the magnets and positioning holes respectively communicated with the mounting holes, each of the positioning holes is located on a side of a corresponding one of the mounting holes, the limiting member includes protrusions extending toward the rotor body, the protrusions are at least partially inserted into the positioning holes to abut the magnets, respectively.

The present invention also provides a motor, includes a stator and the above-mentioned rotor assembly, the rotor assembly is rotatably arranged in the stator.

The present invention also provides a power tool, includes the above-mentioned motor.

In the rotor assembly provided by the embodiment of the present invention, the magnets can be installed and fixed in the rotor core only by means of mechanical assembly, the number of components of the rotor assembly is reduced, the assembly is convenient, and the manufacturing cost is effectively reduced.

BRIEF DESCRIPTION OF THE DRAWINGS

FIG. 4b shows an end view of the rotor core of FIG. 4a.

DETAILED DESCRIPTION OF THE PREFERRED EMBODIMENTS

Figure 1:
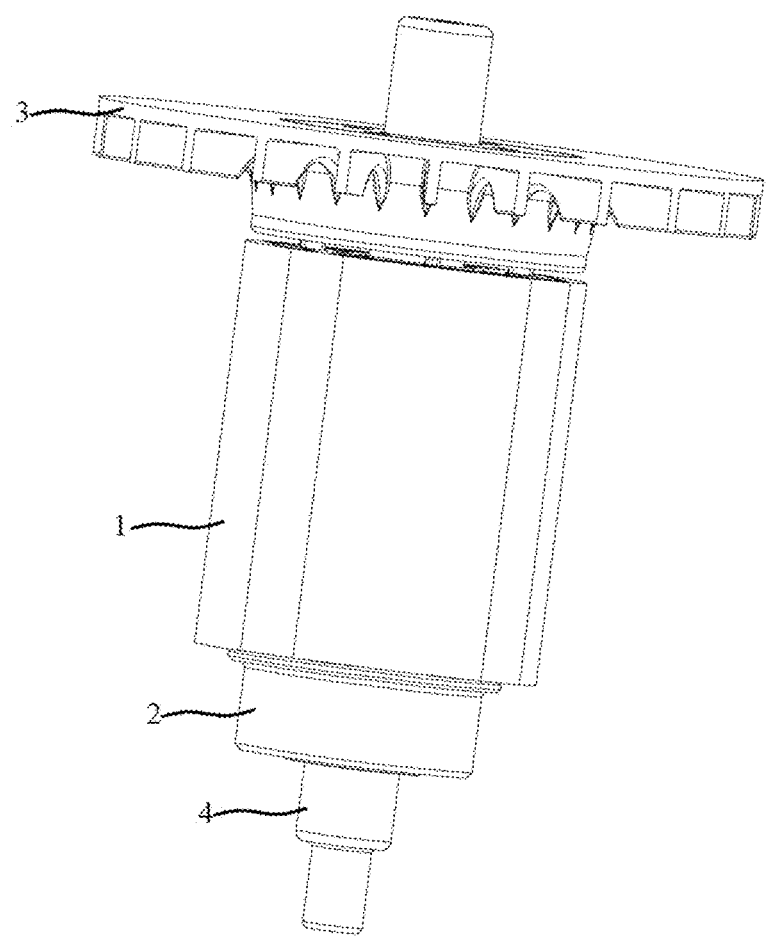
FIG. 1 shows an assembled, perspective view of a rotor assembly according to an embodiment of the present invention.

Hereinafter, the present invention will be described in detail with reference to the accompanying drawings and specific embodiments, so as to make the technical solutions and beneficial effects of the present invention clearer. It can be understood that the drawings are only provided for reference and explanation, and are not used to limit the present invention. The dimensions shown in the drawings are only for the convenience of clear description, and do not limit the proportional relationship.

FIG. 1 shows an assembled, perspective view of a rotor assembly 100 according to a first embodiment of the present invention. The rotor assembly 100 includes a rotating shaft 4, and a rotor body 1, a limiting member 2 and a cooling fan 3 fixed on the rotating shaft 4. The limiting member 2 and the cooling fan 3 are respectively arranged at both ends of the rotor body 1 in the axial direction.

Figure 2:
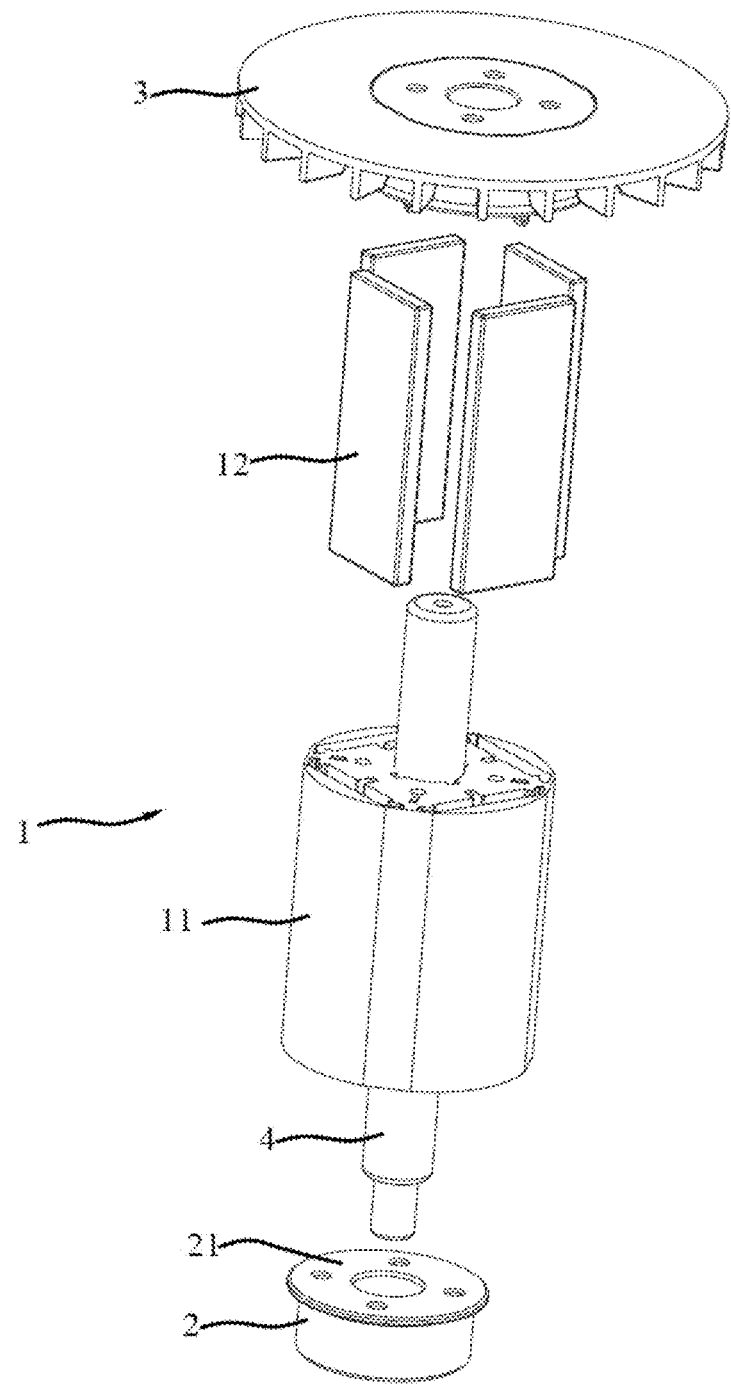
FIG. 2 shows an exploded perspective view of the rotor assembly of FIG. 1.
Figure 3A:
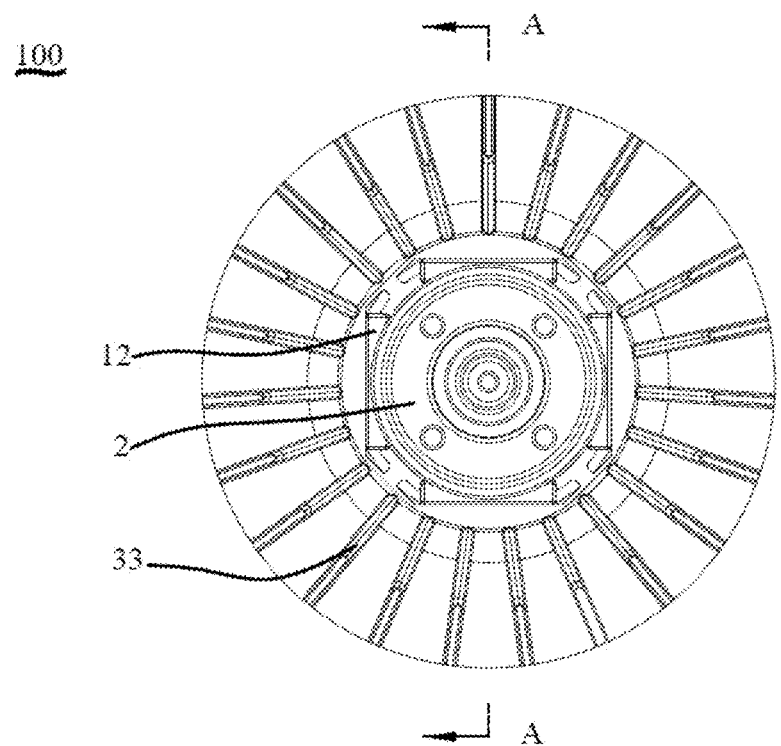
FIG. 3a shows a bottom view of the rotor assembly of FIG. 1.
Figure 3B:
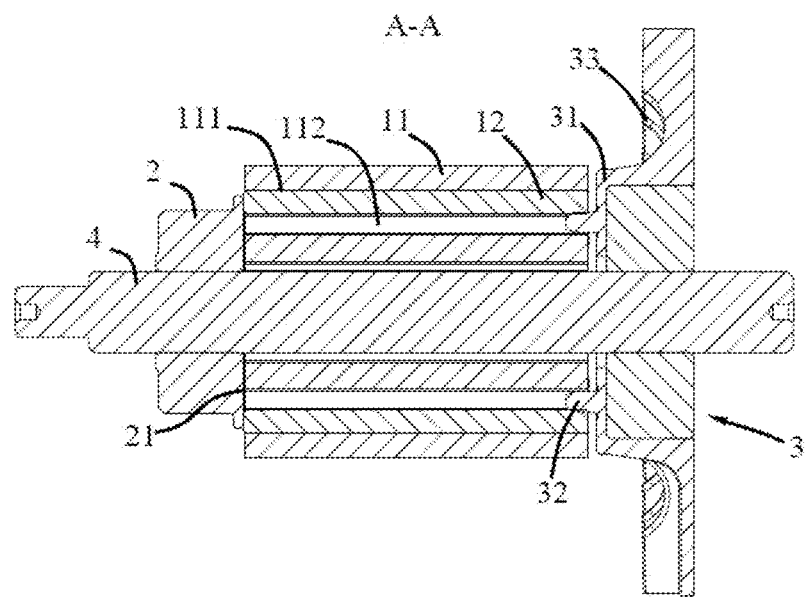
FIG. 3b shows a cross-sectional view of the rotor assembly of FIG. 3a along section line A-A.

Referring to FIGS. 2, 3a and 3b simultaneously, the rotor body 1 includes a rotor core 11 and a plurality of magnets 12 inserted into the rotor core 11 in the axial direction. The plurality of magnets 12 are arranged in the rotor core 11 at circumferential intervals around the rotating shaft 4. In this embodiment, the length of the magnet 12 in the axial direction of the rotating shaft 4 is approximately equal to the axial length of the rotor core 11, that is, two ends of the magnet 12 in the axial direction are substantially flush with two axial ends of the rotor core 11 in the axial direction, respectively. Both ends of the magnet 12 in the axial direction of the rotating shaft 4 respectively abut against the limiting member 2 and the cooling fan 3, to prevent the magnet 12 from moving relative to the rotor core 11. In other embodiments, the length of the magnet 12 may also be slightly smaller than the axial length of the rotor core 11.

Figure 4A:
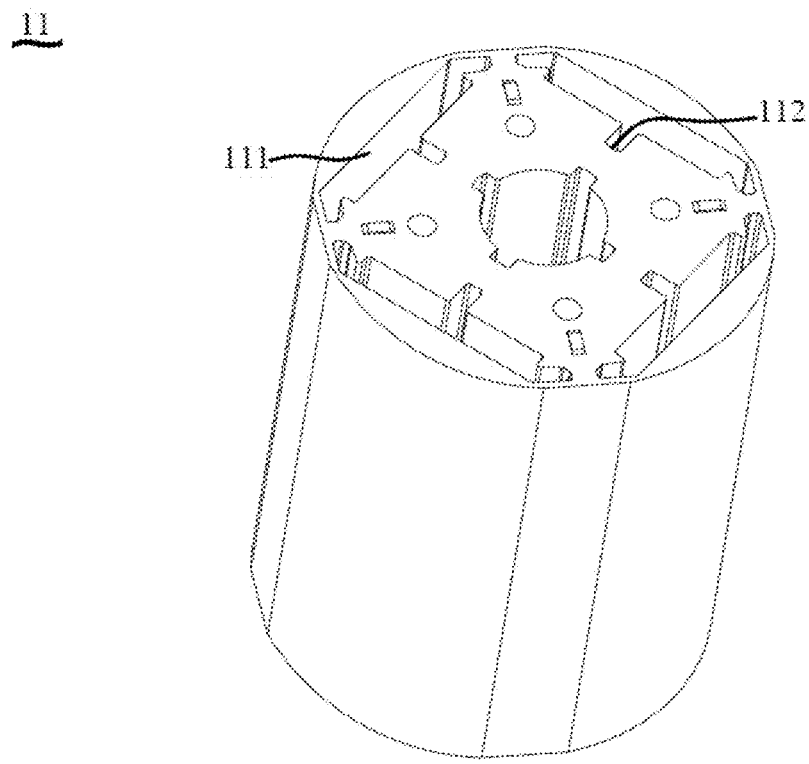
FIG. 4a shows a perspective view of a rotor core of the rotor assembly of FIG. 1.
Figure 4B:
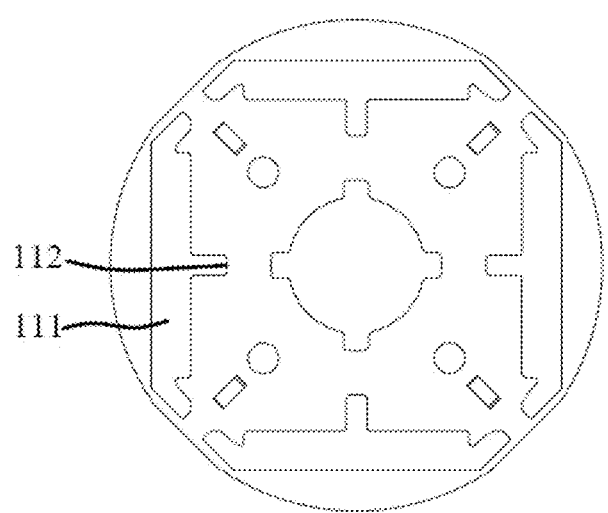

Referring to FIGS. 4a and 4b simultaneously, the rotor core 11 is substantially cylindrical, and is provided with mounting holes 111 for mounting the magnets 12, the mounting holes 111 extend axially and penetrate the rotor core 11. The plurality of mounting holes 111 are arranged circumferentially around the rotating shaft 4. In this embodiment, the cross section of the mounting hole 111 is substantially rectangular, and protrusions are provided at both ends for restricting the circumferential movement of the magnet. The rotor core 11 further defines a positioning hole 112 at the center of the radial inner side of each mounting hole 111, and the positioning hole 112 communicates with the corresponding mounting hole 111. In this embodiment, the positioning holes 112 extend perpendicular to the radial inner sides of the corresponding mounting holes 111, and the positioning holes 112 also penetrate the rotor core 11 in the axial direction. In other embodiments, the axial length of the positioning holes 112 may be smaller than the axial length of the rotor core 11, that is, the positioning holes 112 only extend a certain distance in the axial direction from one end face of the rotor core 11, and does not penetrate through the other end face of the iron core 11. Preferably, the positioning holes 112 are located at the centers of the radial inner sides of the mounting holes 111. The magnets 12 are inserted into the mounting holes 111. In this embodiment, the rotor body 1 includes four magnets 12, and the magnets 12 are in the shape of rectangular plates. Correspondingly, there are four mounting holes 111, which are evenly spaced along the circumference of the rotor core 11, and are arranged in a square shape together. It can be understood that the specific numbers of the mounting holes 111 and the positioning holes 112 and the specific positional relationship between them can be set according to actual needs.

Figure 5:
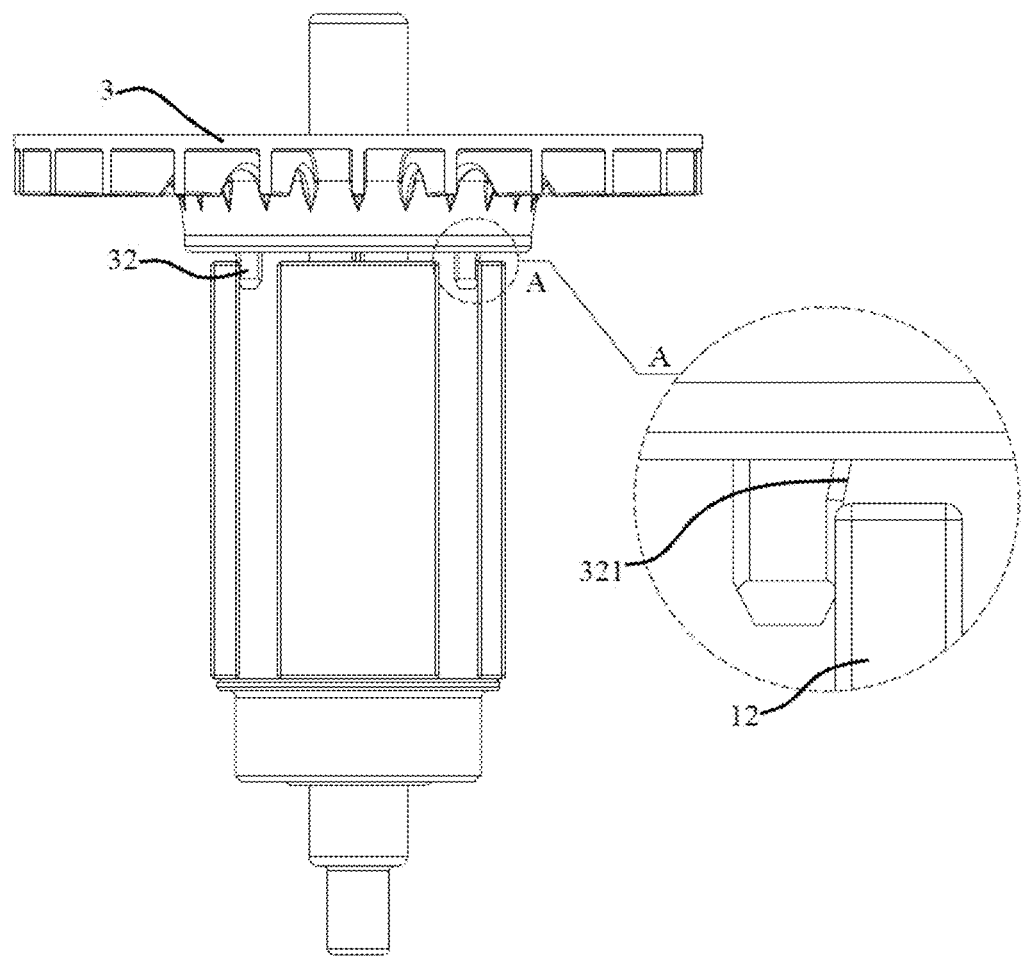
FIG. 5 schematically shows the positional relationship of a cooling fan and magnets of the rotor assembly of FIG. 1.

The cooling fan 3 includes a base 31 and a number of blades 33 on the outer periphery of the base. The base 31 has a substantially circular shape, and is disposed facing the rotor body 1. A side of the base 31 facing the rotor body 1 has a plurality of protrusions 32 extending toward the rotor body 1. The protrusions 32 can be at least partially inserted into the positioning holes 112 of the rotor core 11 and abut the magnets 12 installed in the corresponding mounting holes 111. Referring to FIG. 5 at the same time, the radially outer side of an end of each protrusion 32 close to the base 31 has an outwardly extending inclined surface 321, so that the radial dimension of the end of the protrusion 32 close to the base 31 is larger than the radial dimension of a free end of the protrusion 32, the inclined surface 321 abuts against an end of the magnet 12 installed in the mounting hole 111, thereby restricting the axial movement of the magnet 12 toward the cooling fan 3 and the movement of the magnet 12 in the radial direction. The arrangement of the protrusions 32 and their inclined surfaces 321 enables the corresponding magnets 12 to be pressed in the mounting holes 111 of the rotor core 11, and the arrangement of the inclined surfaces 321 can allow certain assembly deviations, thereby reducing the requirements for machining accuracy. In this embodiment, the protrusions 32 are made of plastic, preferably, integrally injection-molded with the base 31 and the blades 33.

In this embodiment, the protrusions 32 have inclined surfaces 321 for axially and radially limiting the magnets 12. In other embodiments, the inclined surfaces 321 can be replaced by steps, and the steps abut on the ends of the magnets 12, which can limit the axial movement of the magnets 12 in the direction towards the cooling fan 3. The inclined surfaces 321 or the steps constitute stop portions of the protrusions 32, and act as stops for the axial end portions of the magnets.

In other embodiments, the positioning holes 112 may be arranged on the radial outer sides of the mounting holes 111, in this case, the inner sides of the protrusions abut the magnets, and the radial inner sides of the ends of the protrusions close to the base 31 may be provided with corresponding inclined surfaces in order to limit the axial movement of the magnets 12 toward the cooling fan 3 and the movement of the magnets 12 in the radial direction. In other embodiments, the radially inner and outer sides of the end of each protrusion near the base 31 are provided with inclined surfaces to limit the axial movement of the magnet 12 toward the cooling fan 3 and the movement of the magnet 12 in the radial direction. It can be understood that the arrangement of the protrusions and their inclined surfaces can be designed according to actual requirements.

The limiting member 2 is fixed on the rotating shaft 4, which is located at the other end of the rotor body 1. A surface of the limiting member 2 facing the rotor body 1 is a limiting surface 21, and the limiting surface 21 abuts against the other axial end of the rotor body 1 and abuts against the other ends of the magnets 12, thereby limiting the axial movement of the magnets toward the limiting member 2. In this way, the limiting member 2 cooperates with the cooling fan 3 to limit the axial displacement of the magnets 12. In this embodiment, the cross section of the limiting member 2 is circular. Preferably, the radius of the limiting surface 21 of the limiting member 2 is greater than the shortest distance between the magnets 12 and the axis of the rotating shaft 4, and is not greater than the diameter of the rotor core 11. In other embodiments, the limiting member 2 may also be provided with protrusions to engage in the positioning holes, and the radial movement and/or axial movement of the magnets 12 is restricted by the protrusions at one end of the limiting member 2.

In the present invention, the above-mentioned arrangement of the limiting member 2 and the protrusions 32 on the cooling fan 3 enables the magnets 12 installed in the mounting holes 111 of the rotor core 11 to be reliably fixed in the mounting holes 111 only by means of mechanical fixing. Glue-free assembly of the magnets 12 in the rotor core 11 is realized, and the magnets 12 can be kept in proper positions, the number of components in the rotor assembly 100 is reduced, the assembly process is simple, and the cost is effectively reduced.

Figure 6:
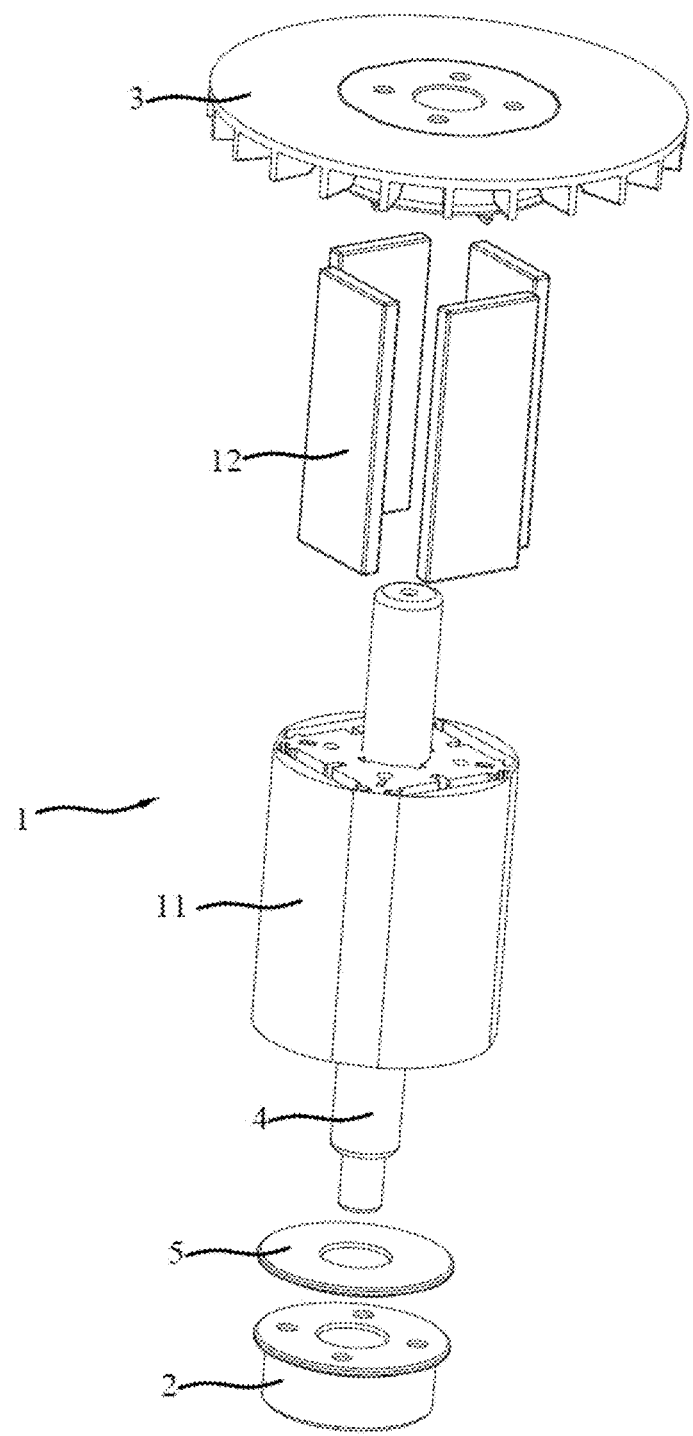
FIG. 6 shows an exploded view of a rotor assembly of another embodiment of the present invention.
Figure 7:
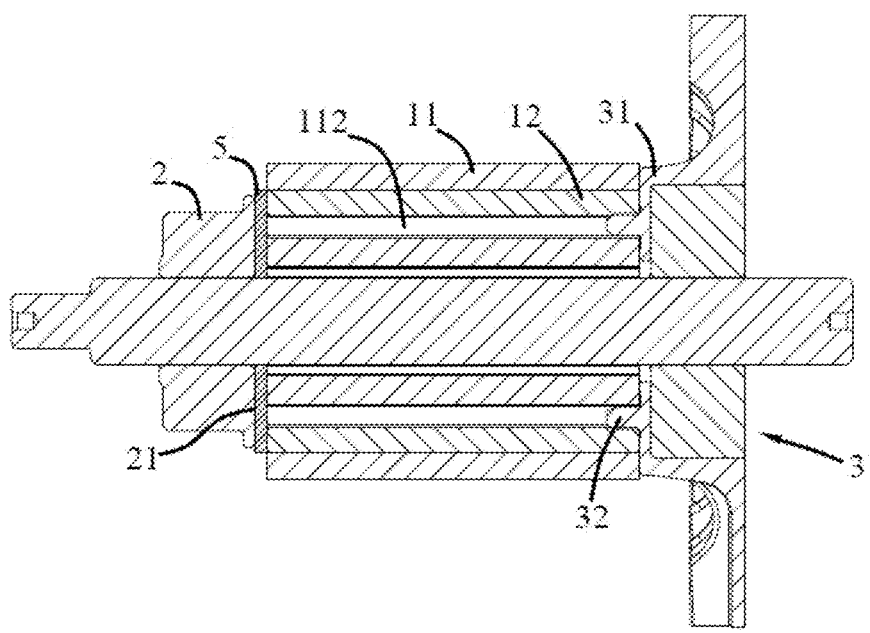
FIG. 7 shows a cross-sectional view of the rotor assembly of FIG. 6 in an assembled state.

FIGS. 6 and 7 illustrate a rotor assembly 100 according to a second embodiment of the present invention. The main difference between this embodiment and the above-mentioned embodiment is that a washer 5 is arranged between the rotor body 1 and the limiting member 2. Preferably, the shape of the washer 5 can be matched with the limiting surface 21 of the limiting member 2, so the above description about the limiting surface 21 is also applicable to the washer 5. Preferably, the washer 5 is made of elastic materials such as rubber, which can provide limited elastic preloading force for the magnets 12 arranged in the rotor core 11.

In addition, in this embodiment, the protrusions 32 of the cooling fan 3 extend perpendicularly from the base 31, that is, the protrusions 32 do not have inclined surfaces. In the present embodiment, the protrusions 32 are completely inserted into the positioning holes 112, so that both ends of the rotor core 11 in the axial direction of the rotating shaft 4 abut against the washer 5 and the surface of the base 31, respectively. Both ends of the magnets 12 installed in the rotor core 11 in the axial direction of the rotating shaft 4 are respectively limited by the limiting member 2 and the cooling fan 3, to prevent axial movement of the magnets 12 relative to the rotor core 11. The elastic preloading force of the washer 5 can press the magnets 12 assembled in the rotor core 11 towards the cooling fan 3, thereby pressing the magnets 12 against the base 31 of the cooling fan 3 without any gap, so the design of the washer 5 allows a certain assembly deviation, thereby reducing the requirements for machining accuracy.

Figure 8:
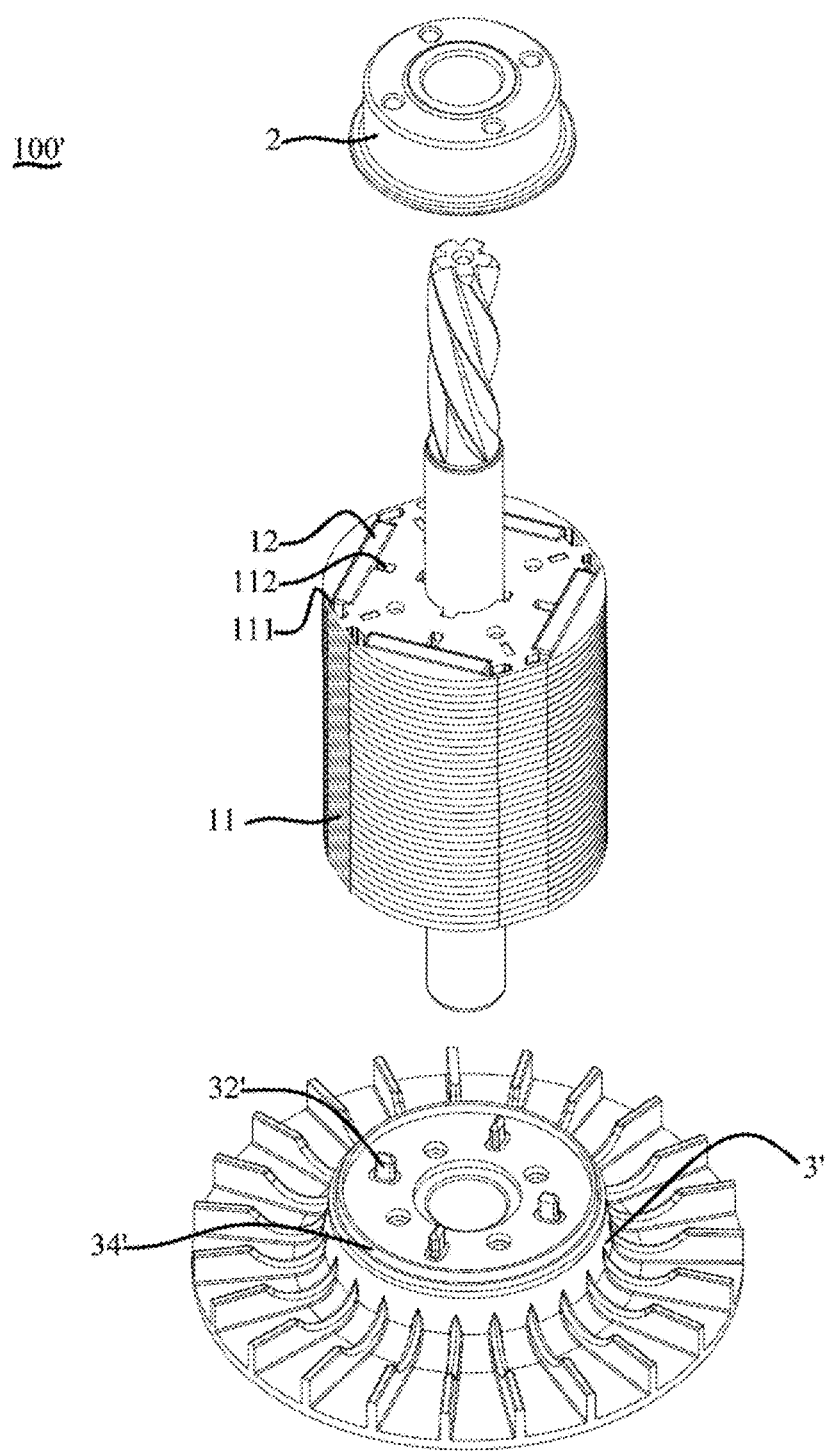
FIG. 8 shows an exploded perspective view of a rotor assembly according to yet another embodiment of the present invention.

FIG. 8 shows a cooling fan 3' of a rotor assembly 100' of a third embodiment of the present invention. Comparing the rotor assembly 100' of the third embodiment with the rotor assembly 100 of the first embodiment, the main difference is that the protrusions 32' of the base 31' of the cooling fan 3' may or may not be provided with inclined surfaces for abutting against the magnets 12 according to the situation, and a side of the base 31' facing the rotor body 1 further includes a flange 34' integrally injection-molded with the base 31' and surrounding the plurality of protrusions 32'. The height of the flange 34' in the axial direction is lower than the height of the protrusions 32'. When installing the rotor assembly 100', the rotor core 11 and the magnets 12 inserted into the mounting holes 111 are pressed toward the cooling fan 3' by an air press or a hydraulic press, and the protrusions 32' are at least partially inserted into the rotor core 11. The rotor core 11 presses the flange 34', so that the flange 34' is squeezed and deformed and partially embedded in the bottom of each mounting hole 111 of the rotor core 11. Therefore, the movement in the radial direction of the magnets 12 accommodated in the rotor core 11 can be restricted by the protrusions 32', and the movement in the axial direction can be restricted by at least the deformed portions of the flange 34' fitted in the mounting holes 111 of the rotor core 11 and the limiting member 2. Thus, the magnets 12 can be better fixed.

In this embodiment, the flange 34' is annular. In other embodiments, the flange 34' can be designed in other shapes or form a plurality of intermittent flanges according to the arrangement of the mounting holes 111, and the height and width of the flange can be designed differently according to requirements.

Figure 9:
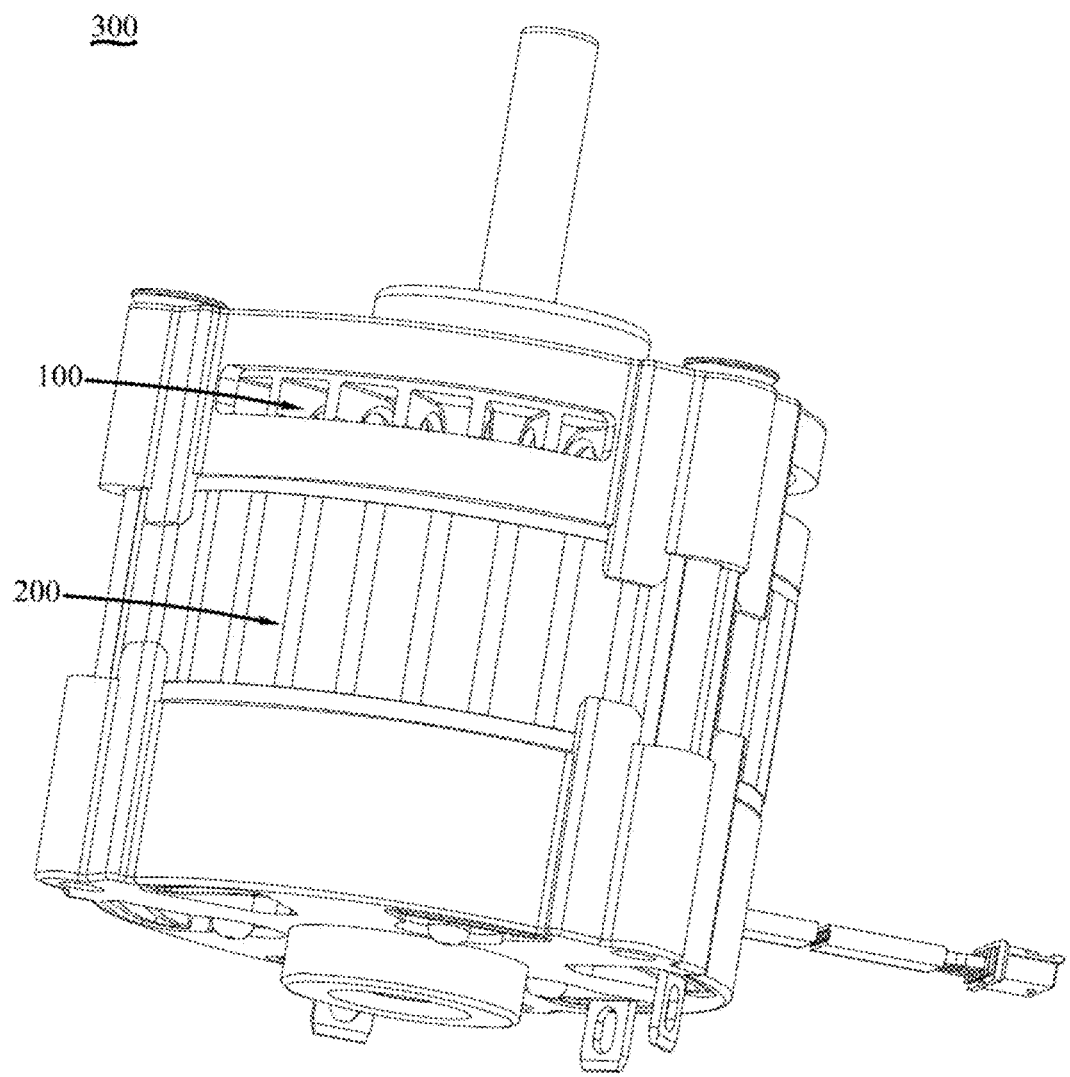
FIG. 9 shows a motor according to an embodiment of the present invention.

FIG. 9 shows a motor 300 having the rotor assembly of the present invention, which includes a stator 200 and the rotor assembly 100 disposed inside the stator 200 and rotatable relative to the stator 200. The motor 300 of the present invention is suitable for, but not limited to, power tools.

Figure 10:
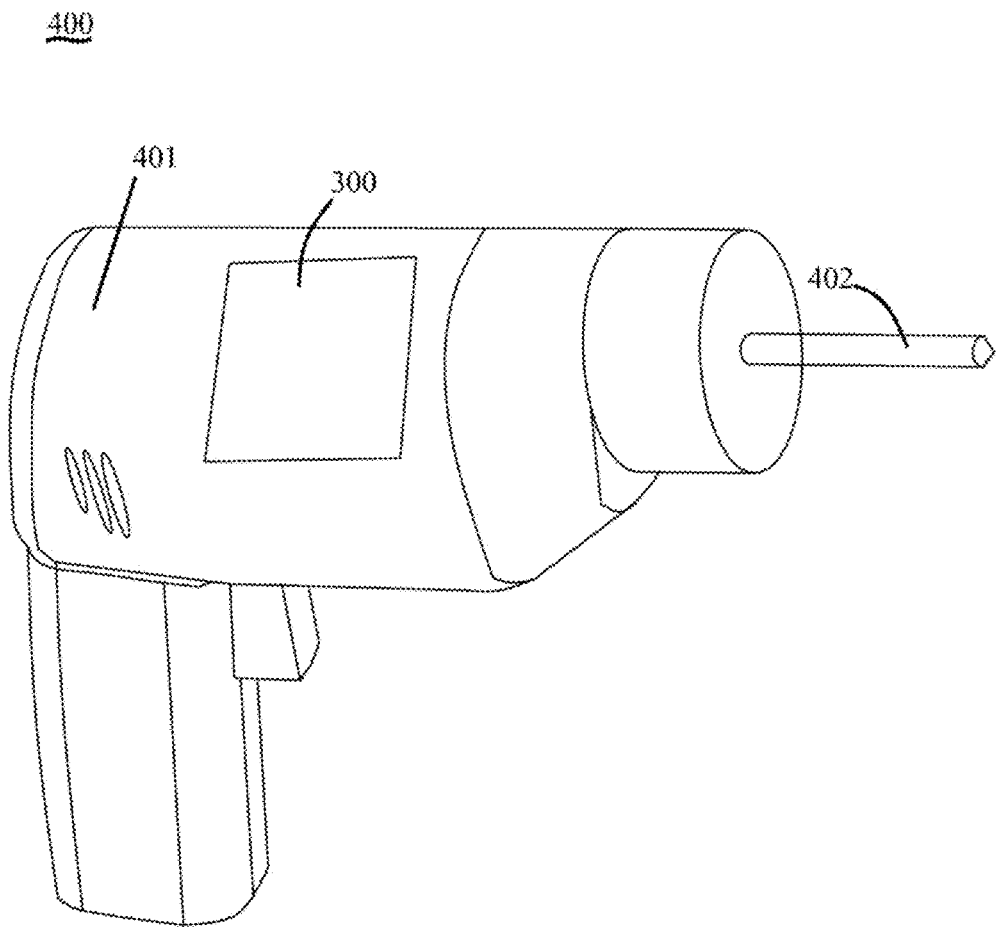
FIG. 10 shows a power tool according to an embodiment of the present invention.

FIG. 10 shows a power tool 400 having the motor 300 of the present invention, which may be, for example, an electric drill, which includes a drill body 401, the motor 300 mounted in the drill body 401, and a drill bit 402 driven by the motor 300. The motor 300 of the present invention can also be applied to other power tools.

The above are only preferred specific implementations of the present invention. The protection scope of the present invention is not limited to the above-listed examples. Any person skilled in the art can obviously obtain the technology within the technical scope disclosed in the present invention. Simple changes or equivalent replacements of the solutions fall within the protection scope of the present invention.

The invention claimed is:

1. A rotor assembly comprising a rotating shaft, and a rotor body, a limiting member and a cooling fan fixed on the rotating shaft, the limiting member and the cooling fan respectively arranged at both axial ends of the rotor body, the rotor body comprising a rotor core and magnets fixed in the rotor core, wherein the limiting member and the cooling fan jointly limit an axial displacement and a radial displacement of the magnets, and wherein the cooling fan abuts first axial ends of the magnets, the cooling fan comprises protrusions integrally formed therewith and extending towards the rotor body, the protrusions abut the first axial ends of the magnets, the rotor core defines mounting holes for mounting the magnets, and positioning holes respectively communicated with the mounting holes, and further wherein each of the positioning holes is located on a center of a side of a corresponding one of the mounting holes facing the rotating shaft or away from the rotating shaft, the length of each positioning hole is shorter than the length of the corresponding mounting hole in the lengthwise direction of the corresponding mounting hole, the protrusions are at least partially inserted into the positioning holes to abut the magnets.

2. The rotor assembly according to claim 1, wherein each protrusion comprises a stop portion, and the stop portion abuts against the first axial end of the corresponding magnet, to prevent the magnet from moving towards the cooling fan.

3. The rotor assembly according to claim 2, wherein a radial dimension of one end of each protrusion close to the cooling fan is larger than a radial dimension of a free end of the protrusion to form the stop portion, the stop portion is an inclined surface or a step.

4. The rotor assembly according to claim 1, wherein the cooling fan comprises a flange integrally formed therewith and extending toward the rotor body, the flange is deformed by the pressing of the rotor core during the installation of the rotor assembly, and at least partially abuts against the first axial ends of the magnets.

5. The rotor assembly according to claim 4, wherein at least parts of the flange are embedded in bottoms of the mounting holes of the rotor core after being deformed to abut the magnets.

6. The rotor assembly according to claim 1, wherein the limiting member abuts against second axial ends of the magnets opposite to the first axial ends directly or through an elastic washer.

7. A motor, comprising a stator and the rotor assembly according to claim 1, wherein the rotor assembly is rotatably arranged in the stator.

8. A power tool, comprising the motor according to claim 7.

\* \* \* \* \*